(12) United States Patent
Webb et al.

(10) Patent No.: US 6,825,966 B2
(45) Date of Patent: Nov. 30, 2004

(54) OPTICAL PHASE SHIFTING DEVICE

(75) Inventors: David L. Webb, Rueschlikon (CH); Huub L. Salemink, Groesbeeck (NL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/284,540

(22) Filed: Oct. 30, 2002

(65) Prior Publication Data

US 2003/0090775 A1 May 15, 2003

(30) Foreign Application Priority Data

Nov. 13, 2001 (EP) .............................. 01126918

(51) Int. Cl.⁷ ................................................ G02F 1/01
(52) U.S. Cl. ........................ 359/279; 359/288; 385/123; 385/3
(58) Field of Search ................................ 359/279, 245, 359/288; 385/2–5, 8–9, 14, 49–50, 129–132, 123; 372/34, 36, 29.023

(56) References Cited

U.S. PATENT DOCUMENTS 6,163,633 A * 12/2000 Ueda ........................... 385/16
6,278,822 B1 * 8/2001 Dawnay ....................... 385/50
6,580,859 B1 * 6/2003 Maier .......................... 385/122
6,643,429 B2 * 11/2003 Robinson et al. ............. 385/37
2003/0086448 A1 * 5/2003 Deacon ........................ 372/20

* cited by examiner

Primary Examiner—Jordan M. Schwartz
Assistant Examiner—Jessica Stultz
(74) Attorney, Agent, or Firm—Moser, Patterson & Sheridan, LLP.; Kin-Wah Tong, Esq.; Wan Yee Cheung, Esq.

(57) ABSTRACT

An electrically adjustable phase-shifting device is arranged on a substrate comprising at least a first waveguide designed for guiding optical signals and a thermoelectric element arranged adjacent to the first waveguide in order to shift the phase of an optical signal in the first waveguide by means of a thermo-optic effect according to a control voltage applied to the thermoelectric element. In one embodiment, the thermoelectric element is a Peitier element which comprises at least first and second electrically conducting segments which are serially connected, the first and second elements alternating consecutively.

2 Claims, 7 Drawing Sheets

PRIOR ART

OPTICAL PHASE SHIFTING DEVICE

The present invention relates to an adjustable optical phase-shifting device according to claim 1.

More particularly, the present invention relates to an adjustable optical phase-shifting device created for use in directional couplers, optical ring resonators, dispersion compensating devices, Mach-Zehnder interferometers, add-drop multiplexers, optical wavelength converters or amplitude-shift keying (ASK) as well as phase-shift keying (PSK) modulators operating particularly in low wavelength regions.

BACKGROUND OF THE INVENTION

Optoelectronic integrated circuits made in thin-film technology often comprise phase-shifting devices used for the adjustment of the phase of an optical signal guided in a first waveguide relative to the phase of an optical signal guided in a second waveguide.

According to Govind P. Agrawal, Fiber Optic Communication Systems, Wiley Series in microwave and optical engineering, New York 1992, chapter 6.2.1, pages 232–234, optical signals can be modulated by means of a Mach-Zehnder interferometer comprising two arms wherein the phase of optical carrier signals is shifted relatively to each other according to electrical binary data. As long as the phase of the optical carrier signals, which originate from the same source, is identical, then the corresponding optical fields interfere constructively. An additional phase shift of adequate size introduced in one of the arms destroys the constructive nature of the interference of the optical carrier signals which are superpositioned on an output line of the ASK-modulator. The additional phase shift in the given example is introduced through voltage-induced index changes of the electro-optic materials (e.g. $LiNbO_3$) used for said arms of the Mach-Zehnder interferometer as described in [2], Richard C. Dorf, THE ELECTRICAL ENGINEERING HANDBOOK, CRC Press LLC, Boca Raton 1997, chapter 31.3, pages 829–837.

Phase shifting devices are also used in directional couplers. An optical waveguide directional coupler filter with waveguides in $LiNbO_3$ which is tunable with electrical control signals is disclosed in U.S. Pat. No. 4,146, 297.

In C. K. Madsen, G. Lenz, A. J. Bruce, M. A. Capuzzo and L. T. Gomez, Phase Engineering Applied to Integrated Optical Filters, IEEE Lasers and Electro-Optics Society, 12th annual meeting, San Francisco 1999, allpass filter rings and linear delay response architectures for dispersion compensations are described. A basic ring architecture consists of a tunable optical waveguide ring which is coupled to an optical waveguide through which optical signals are transferred. A thermo-optic effect is used to shift the phase of the signals within the ring. In order to obtain a desired filter response, it is critical to accurately fabricate the desired coupling ratio. To reduce the fabrication tolerances on the couplers and simultaneously to obtain a fully tunable allpass response, the basic ring architecture is preferably enhanced with a Mach-Zehnder interferometer (see FIG. 1). This enhanced ring structure, below called ring resonator, is briefly explained with reference to FIGS. 1 and 2.

FIG. 1 shows a prior art directional coupler with a first and a second waveguide 3, 4 aligned in parallel, with a first and a second coupler 301, 302, through which optical signals can be exchanged between said waveguides 3, 4, and with one thin film heater 100 covering a part of the first waveguide 3 lying between the couplers 301, 302. An optical signal entering the first waveguide 3 at port A will partially be coupled from the first coupler 302 to the second waveguide 4. Between the couplers 301, 302 the phase of the remainder of the optical signal transferred in the first waveguide 3 will be shifted according to the thermal energy applied to the first waveguide 3 by means of the thin film heater 100. The optical signal in the first waveguide 3 then interferes in the second coupler 302 with the optical signal of the second waveguide 4. Depending on the phase relationship between the optical signals the signal intensity in the second waveguide 4 will be increased or reduced accordingly.

In case that the second waveguide 4 is formed as a ring and enhanced with a thin film heater 101 for phase-shifting purposes, then the architecture shown in FIG. 1 corresponds to the tunable ring resonator shown in FIG. 2 respective, FIG. 1 which may be used for dispersion compensation.

In order to obtain a desired shift of the phase of the optical signal in the first waveguide 3 relative to the phase of the optical signal in the second waveguide 4 thermal energy provided by the thin film heater 100 is applied to the first waveguide 3 and not to the second waveguide 4. In the region of the thin film heater 100 the waveguides 3, 4 are therefore spaced apart at a distance which is sufficient to avoid a transfer of thermal energy from the thin film heater 100 to the second waveguide 4. Thermal energy provided by the thin film heater 100 is absorbed by the substrate 5 acting as a heat sink in such a way that the thin film heater 100 forces a temperature gradient with respect to the substrate 5.

Since the waveguides 3, 4 of the tunable ring resonator are kept apart from each other between the couplers 301, 302 over a relatively long distance, the architectures shown in FIGS. 1 and 2 are difficult to realise in small sizes as required for high frequency applications operating for example in the range of 25 GHz to 75 GHz.

As described above the temperature gradient will depend on the temperature and nature of the substrate 5 which may not be homogeneous over the whole circuit. With a change of the ambient temperature the operating conditions of the discussed circuit may vary considerably. Information regarding the temperature and hence the refractive index of the related waveguide is not provided by the circuit so that means for controlling the function of the circuit are limited. In addition shifting only the phase of the optical signal guided in the first waveguide of the device shown in FIG. 1 by establishing a temperature gradient between the heater 100 and the substrate 5 appears to be inefficient.

It would therefore be desirable to improve the described phase-shifting devices. It would be desirable to create an easily controllable phase-shifting device operating with high efficiency. It would be desirable to create a phase-shifting device which operates independently of changes of the ambient temperature. It would further be desirable to create a phase-shifting device which, besides the phase-shifting function, comprises a coupling function.

It would be desirable in particular to create a phase-shifting device for tunable ring resonators, directional couplers, add-drop multiplexers, Mach-Zehnder interferometers, optical filters, dispersion compensating devices, optical wavelength converters or amplitude-shift keying (ASK) as well as phase-shift keying (PSK) modulators suitable for operating in high frequency ranges.

It would also be desirable to control the adjusted temperature in order to reach and hold a selected phase shift in a narrow range.

It would further be desirable to create a phase-shifting device which in conjunction with related circuitry can be fabricated at reduced cost and in high packing density.

SUMMARY OF THE INVENTION

The above and other objects of the present invention are achieved by a device according to claim 1.

A phase-shifting device, which is electrically adjustable, is arranged on a substrate comprising at least a first waveguide and a thermoelectric element arranged adjacent to the first waveguide in order to shift the phase of an optical signal in the first waveguide by means of a thermo-optic effect according to a control voltage applied to the thermoelectric element which, according to the present invention, is a Peltier element comprising during operation a cold and hot side.

In a preferred embodiment of the invention the cold side of the thermoelectric element is arranged adjacent to the first waveguide and the hot side of the thermoelectric element is connected to a heat sink element.

In order to establish a temperature gradient between the first and a second waveguide in a further embodiment of the invention one thermal side of the thermoelectric element is arranged adjacent to the first waveguide and the other thermal side is arranged adjacent to the second waveguide. In this way the temperatures within the first and the second waveguide can efficiently and independently of external conditions be changed.

In integrated devices comprising an etched waveguide layer deposited on the substrate the electrically conducting segments are preferably placed upon and/or integrated into the cladding layer which is covering the waveguide layer.

In a preferred embodiment semiconductor parts of P- or N-type are diffused alternating into the cladding layer. In this case metal conductors preferably made of aluminum are used for connecting the corresponding ends of the semiconductor parts thus forming the thermoelectric element.

In another embodiment of the invention one thermal side of a first thermoelectric element is arranged adjacent to a first waveguide and the thermal side of opposite thermal polarity of a second thermoelectric element is arranged adjacent to a second waveguide with the other thermal sides of the thermoelectric elements being connected to each other with a heat conductive element. In this way the steepness of the temperature gradient established between the first and the second waveguide is increased thus increasing the sensitivity and range of the control function.

The response time of the phase-shifting device may be reduced by using two ore more thermoelectric elements in order to cool or warm a waveguide. This can easily be done by integrating differently doped semiconductor elements into the layers below and above the waveguide layer.

The solution allows to arrange the first and the second waveguide in the region close to the thermoelectric element in close proximity so that light energy of transferred optical signals is coupled from the first to the second waveguide.

Waveguides can therefore be aligned in the phase-shifting device in close proximity allowing to realise optical structures with higher densities. Since waveguides can be aligned in the phase-shifting device in close proximity the phase-shifting device can simultaneously operate as phase-shifting device and directional coupler.

The invention can be implemented advantageously in various optical circuits such as tunable ring resonators, directional couplers, add-drop multiplexers, Mach-Zehnder interferometers, optical filters, dispersion compensating devices, optical wavelength converters or amplitude-shift keying (ASK) as well as phase-shift keying (PSK) modulators suitable for operating in high frequency ranges.

BRIEF DESCRIPTION OF THE DRAWINGS

Some of the objects and advantages of the present invention have been stated, others will appear when the following description is considered together with the accompanying drawings, wherein.

DETAILED DESCRIPTION OF THE PREFERRED EMBODIMENTS

Figure 1:
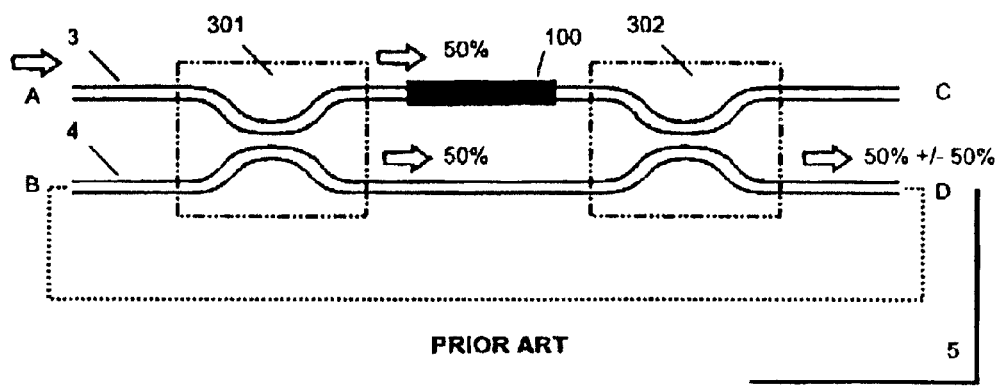
FIG. 1 shows a prior art phase-shifting device integrated in an optical directional coupler.

FIG. 1 shows a prior art phase-shifting device integrated in an optical directional coupler.

Figure 2:
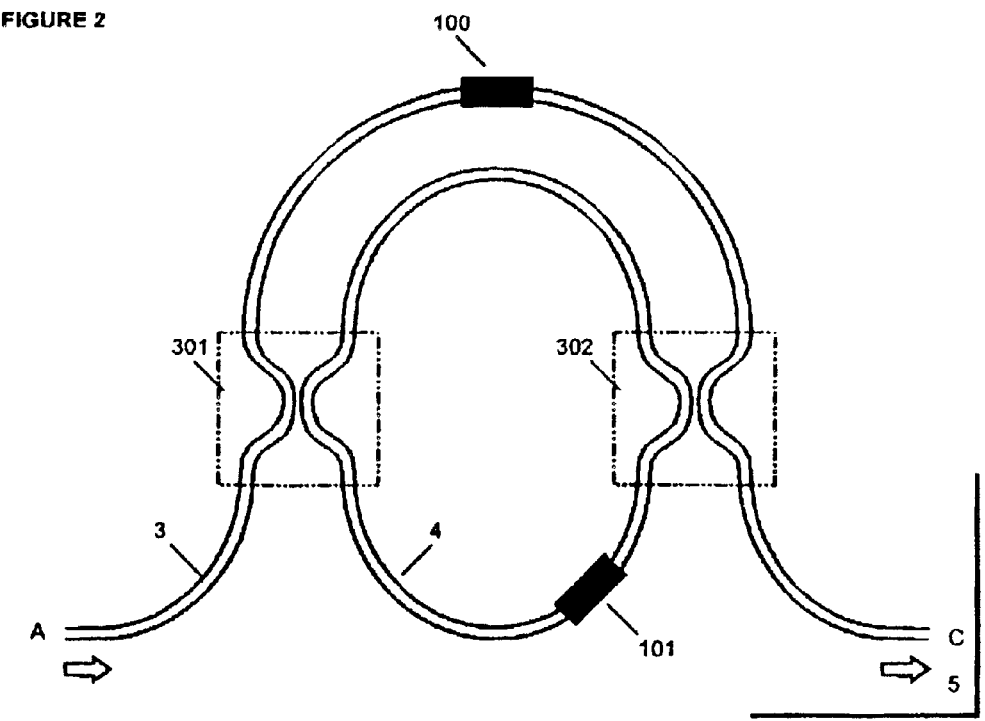
FIG. 2 shows a prior art tunable ring resonator incorporating a phase-shifting device according to FIG. 1.

FIG. 2 shows a prior art tunable ring resonator incorporating a phase-shifting device according to FIG. 1. The devices shown in FIGS. 1 and 2 have been discussed above.

Figure 3:
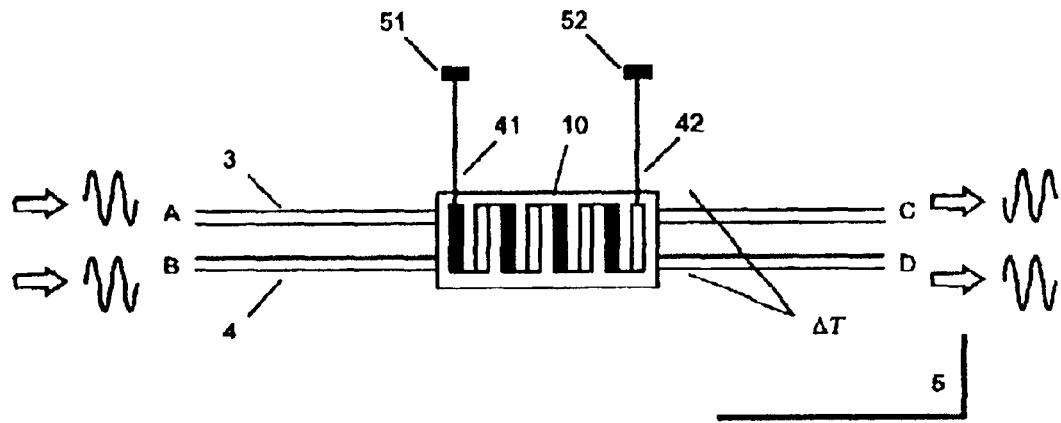
FIG. 3 shows a phase-shifting device comprising a Peltier element.

FIG. 3 shows a phase-shifting device comprising a Peltier element respective a thermoelectric element 10 relying on the Peltier effect.

In 1834, J. Peltier discovered that when an electric current passes through two different metals then a temperature change will occur across the junction of said metals. A thermoelectric element relying on the Peltier effect therefore comprises first and second electrically conducting segments 1, 2 which are serially coupled, the first and the second segment 1, 2 alternating consecutively, so that the even numbered junctions of the electrically conducting segments 1, 2 form one thermal side and the odd numbered junctions of the electrically conducting segments 1, 2 form the other thermal side of the thermoelectric element 10. One thermal side will be the cold and the other one will be the hot side of the thermoelectric element 10.

The thermoelectric element 10 shown in FIG. 3, which over leads 41, 42 and contacts 51, 52 can be connected to a control unit, comprises therefore a cold and a hot side which are placed near or upon a first and a second waveguide 3, 4 respectively in order to establish a temperature gradient between said waveguides 3, 4 according to a control voltage corresponding to a selected phase shift.

Figure 4:
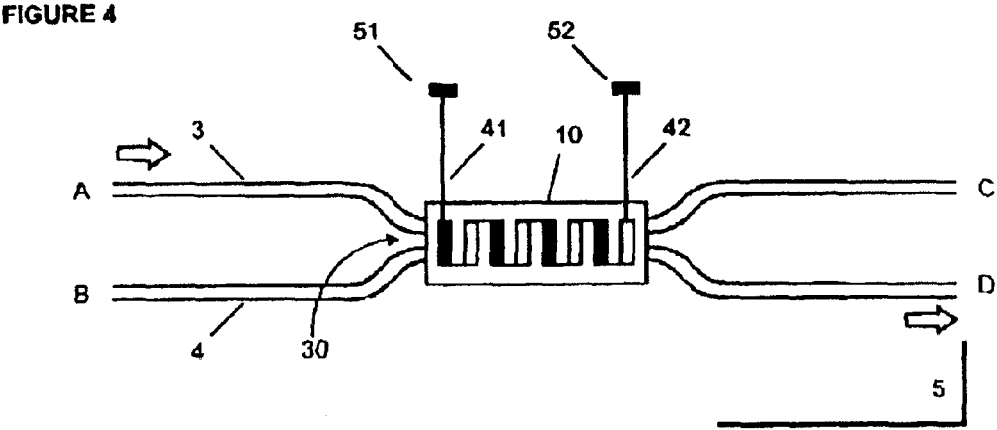
FIG. 4 shows a phase-shifting device comprising a coupling function.

In FIG. 4, the first and the second waveguide 3, 4 are arranged below the thermoelectric element 10 in proximity so that light energy of transferred optical signals can be coupled from the first to the second waveguide 3, 4 and vice versa. Induced temperature changes are translated into changes of the refractive index of the waveguides via a thermo-optic effect. These changes of the refractive index cause a phase shift of the optical signals and therefore a change of the coupling between the waveguides 3, 4.

Figure 12:
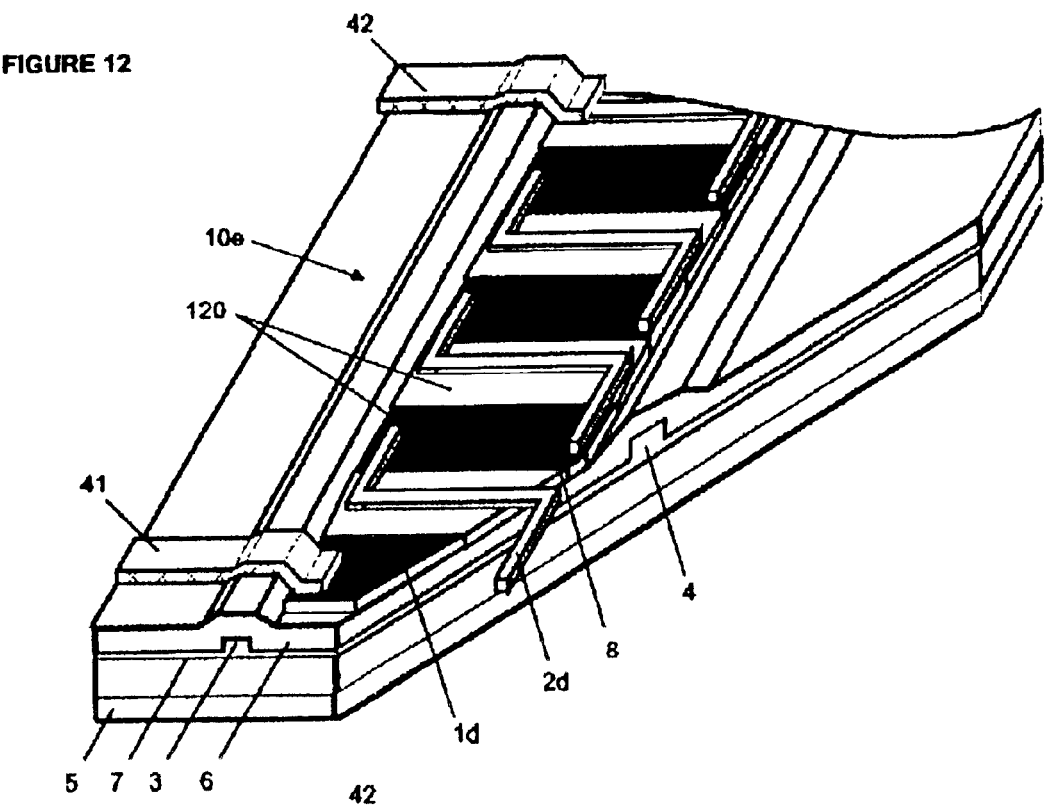
FIG. 12 shows a side elevation of a device with a Peltier element comprising serially connected metal and semiconductor elements which are part of a semiconducting layer which has been placed upon the insulating cladding layer.
Figure 13:
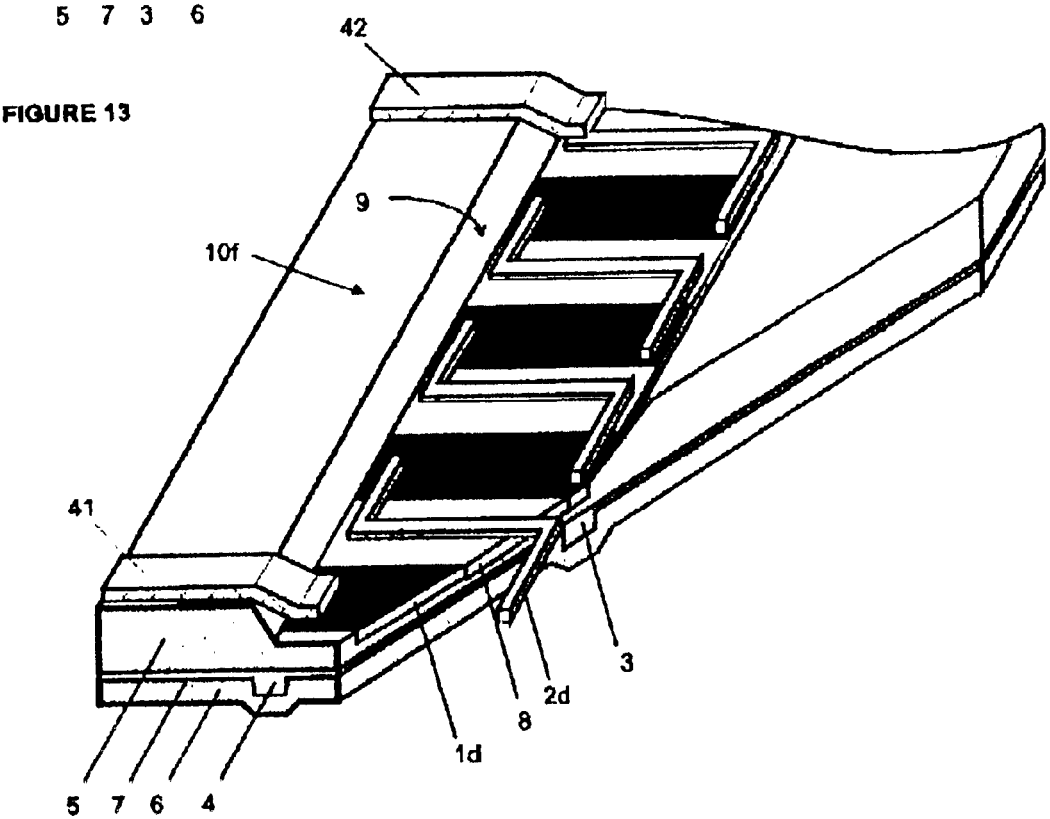
FIG. 13 shows a side elevation of a device with a Peltier element comprising serially connected metal and semiconductor elements which are part of the substrate of the device.
Figure 14:
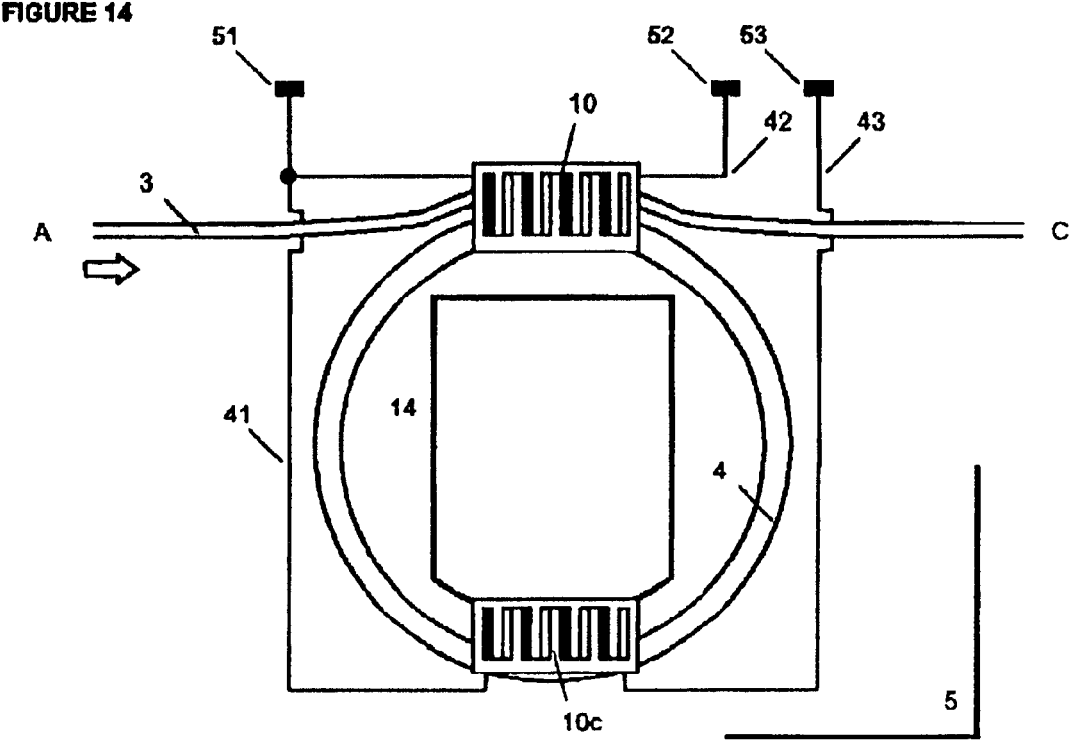
FIG. 14 shows a tunable ring resonator with phase-shifting devices according to FIG. 4 and FIG. 10
Figure 15:
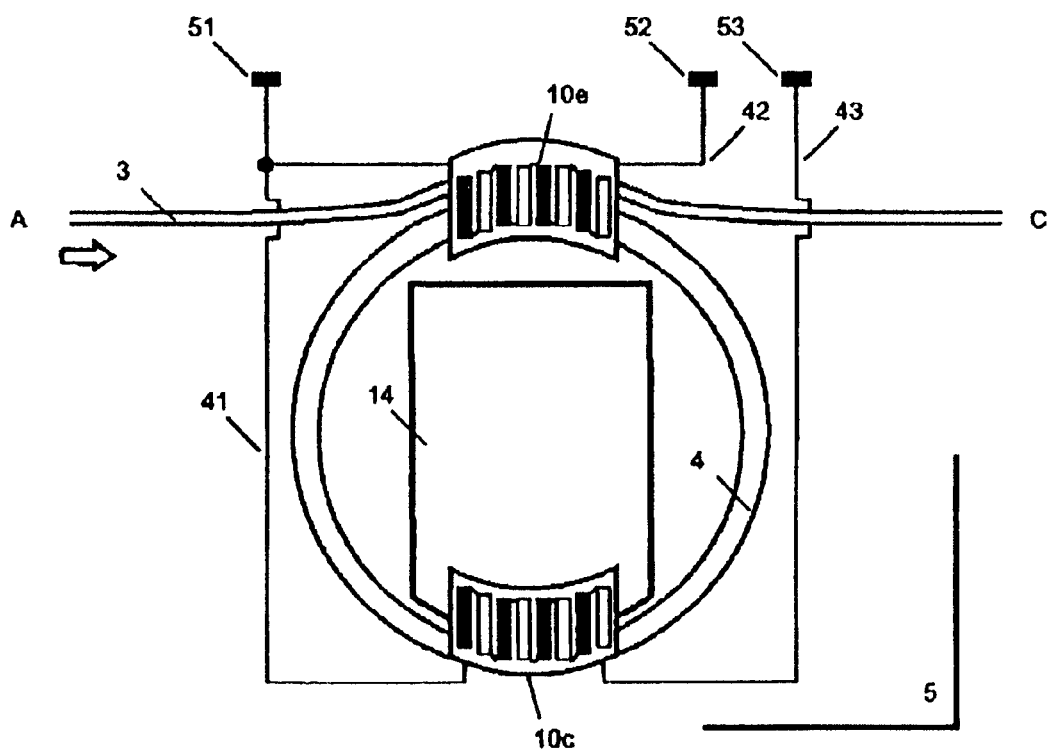
FIG. 15 shows the tunable ring resonator of FIG. 12 with the phase-shifting devices bent along the waveguides.

Since the Peltier element comprises a cold and a hot side a comparably high temperature gradient is applied within a small area 30. Thermal energy is interchanged between both thermal sides depending on the direction and level of the current flow. A heat sink is therefore not required. Since the thermal energy is interchanged between both thermal sides, disturbances of the operating conditions of other modules mounted on the substrate, which could occur while using traditional heaters, are avoided. Optical circuits comprising phase-shifting devices, e.g. ring resonators, as shown in FIGS. 12 and 13, can therefore be realized with increased densities.

Figure 5:
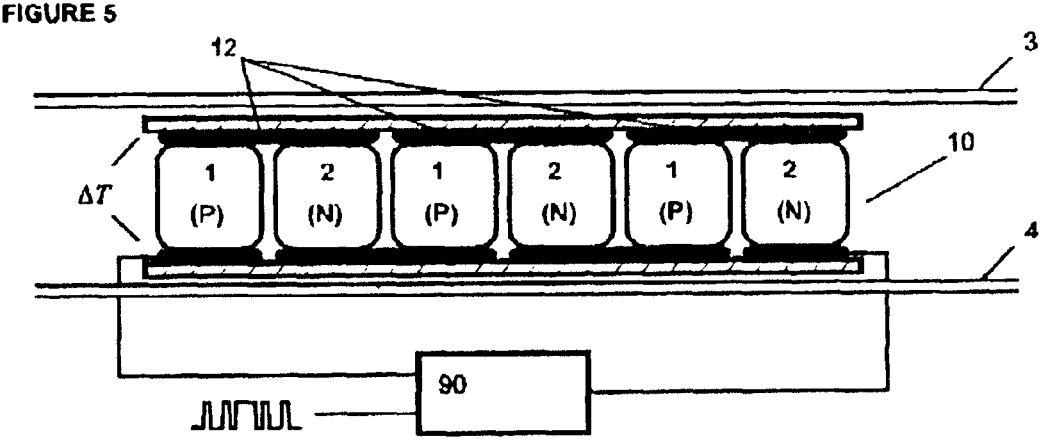
FIG. 5 shows a schematic of the Peltier element of the phase-shifting device according to FIG. 3.

FIG. 5 shows the schematic of a thermoelectric element 10 which is described in Frank Kreith, THE CRC HANDBOOK OF MECHANICAL ENGINEERING, CRC Press LLC, Boca Raton 1998, pages 8-175 to 8-182. The shown thermoelectic element 10, which is connected to a control unit 90, consists of several segments made of N-type or P-type thermoelectric material, semiconductors or metals, connected electrically in series and thermally in parallel and bonded to a substrate. FIG. 5 also schematically shows the optical waveguides 3 and 4 which are heated or cooled according to an input signal provided to the control unit 90.

Figure 6:
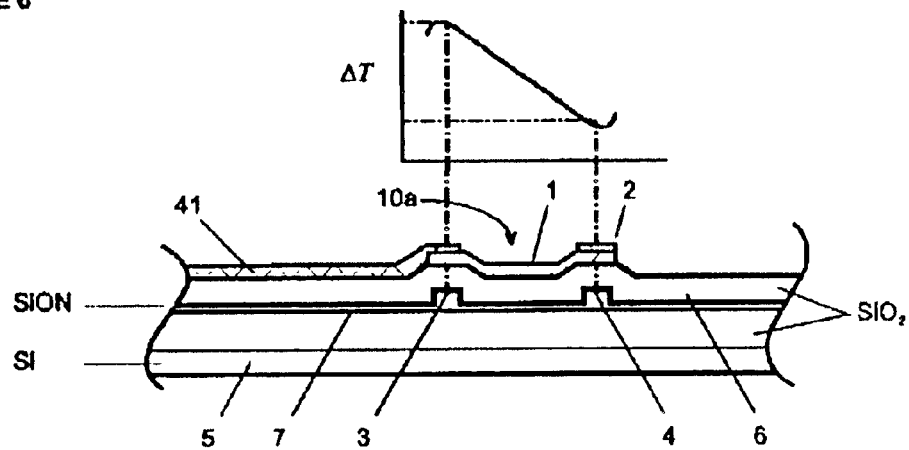
FIG. 6 shows a side elevation of a layered structure of an integrated device according to FIG. 5.
Figure 7:
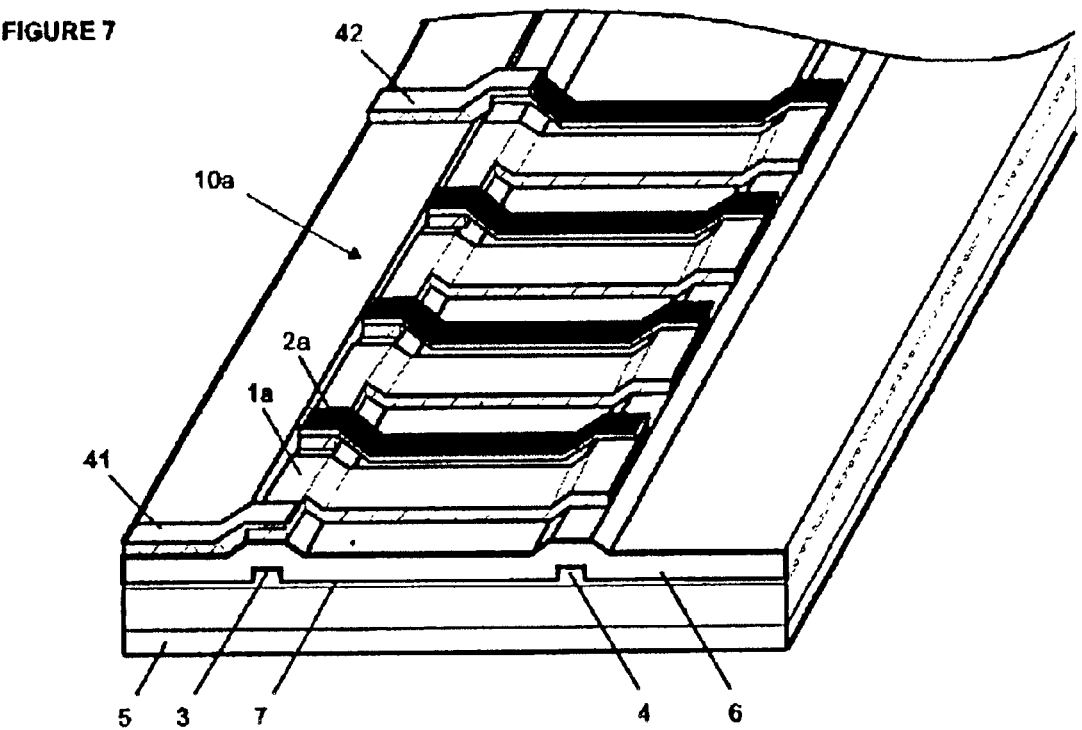
FIG. 7 shows the device of FIG. 6 from a different angle.

FIGS. 6 and 7 show a first embodiment of a phase-shifting device implemented in an optoelectronic integrated circuit comprising an etched waveguide layer 7 deposited on a substrate 5 and being covered by a cladding layer 6 on which serially connected segments 1a, 2a of a thermoelectric element 10a are placed and bonded in such a way that the even numbered junctions of the segments 1a, 2a are placed sequentially along a section of a first waveguide 3 and the odd numbered junctions of the segments 1a, 2a are placed sequentially along a section of a second waveguide 4. As described above thermal energy will flow from the even numbered junctions to the odd numbered junctions of the segments 1a, 2a or vice versa while a current is applied via the leads 41, 42 to the thermoelectric element 10a. The thermoelectric segments 1a, 2a shown in FIGS. 6 and 7 may be made of pure metals or alloys consisting e.g. of aluminum, copper, platinum, iron, chromium, constantan, rhenium, rhodium and/or nickel.

Figure 8:
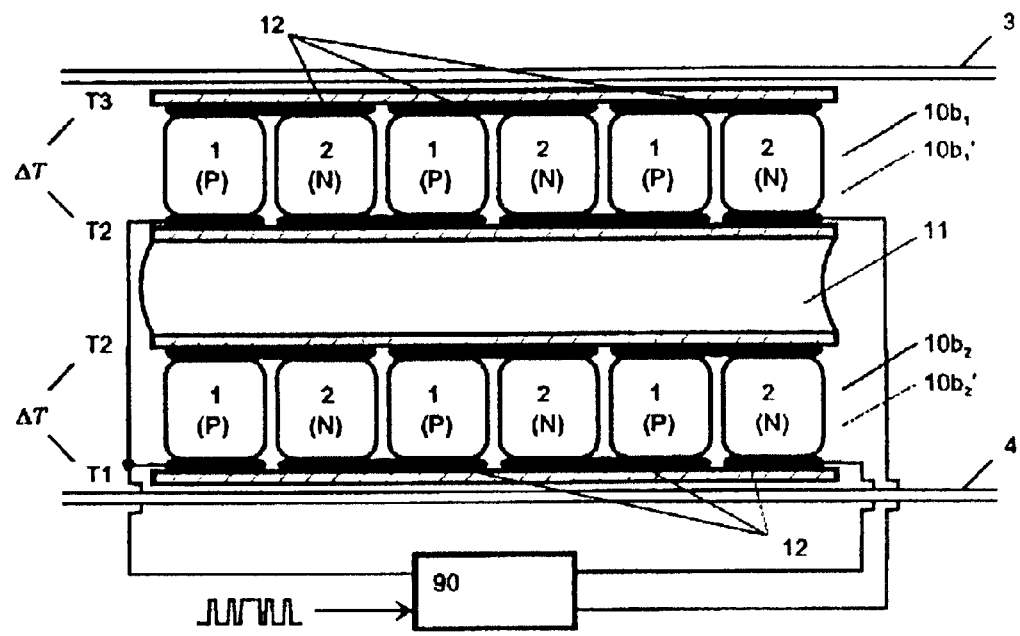
FIG. 8 shows a schematic of two combined Peltier elements implemented in a phase-shifting device according to FIG. 3.

Instead of a single stage thermoelectric cooler as shown schematically in FIG. 5, a multistage or a dual stage thermoelectric cooler, as shown in FIG. 8, may advantageously be used comprising two thermoelectric elements $10b_1$, $10b_2$ which are thermally coupled in series by means of a heat-conductive element 11.

Figure 9:
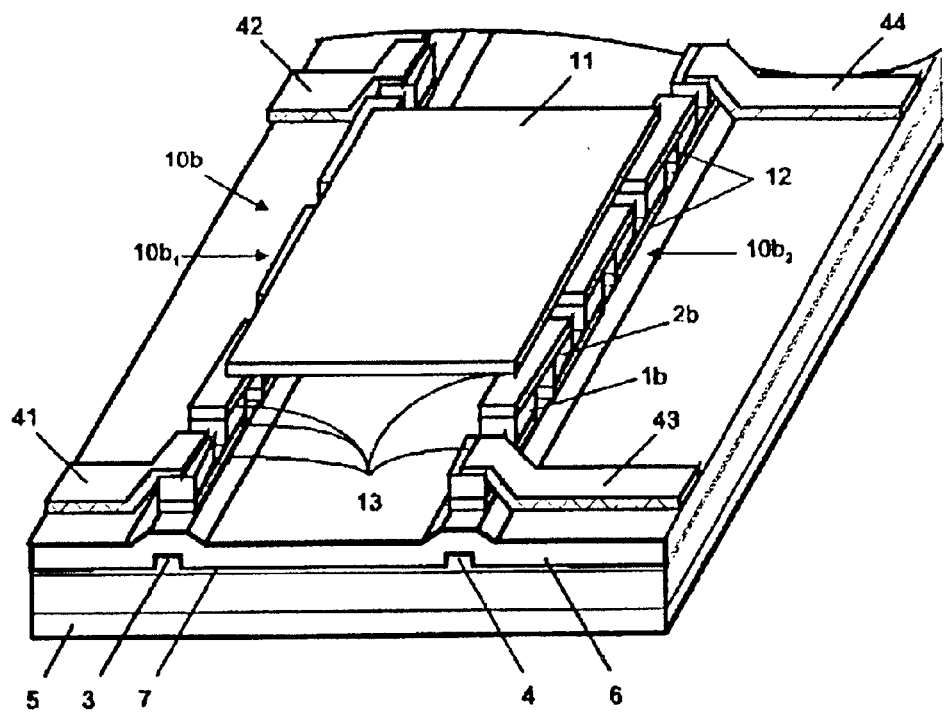
FIG. 9 shows a side elevation of a layered structure of an integrated device with two combined Peltier elements according to FIG. 8.

FIG. 9 shows a preferred embodiment of the invention realised with a dual-stage thermoelectric cooler as shown in FIG. 5.

The junctions 13 forming one thermal side of a first thermoelectric element $10b_1$ are bonded onto the cladding layer aligned above a first waveguide 3. The junctions 13 forming the opposite thermal side of a second thermoelectric element $10b_2$ are bonded onto the cladding layer aligned above a second waveguide 4. The other thermal sides of the thermoelectric elements $10b_1$, $10b_2$ are connected with each other via a heat conductive element 11 such as an aluminum layer.

The segments of the thermoelectric elements $10b_1$, $10b_2$ are, as shown in FIG. 9, serially connected by means of electrically conducting pads 12 which are bonded either to the cladding layer 6 or to the heat conductive element 11.

As indicated in FIG. 8, further thermoelectric elements $10b_1'$ and/or $10b_2'$ could be attached to the waveguides 3, 4 from the opposite side in order to reduce the time for establishing or changing a temperature gradient.

Figure 10:
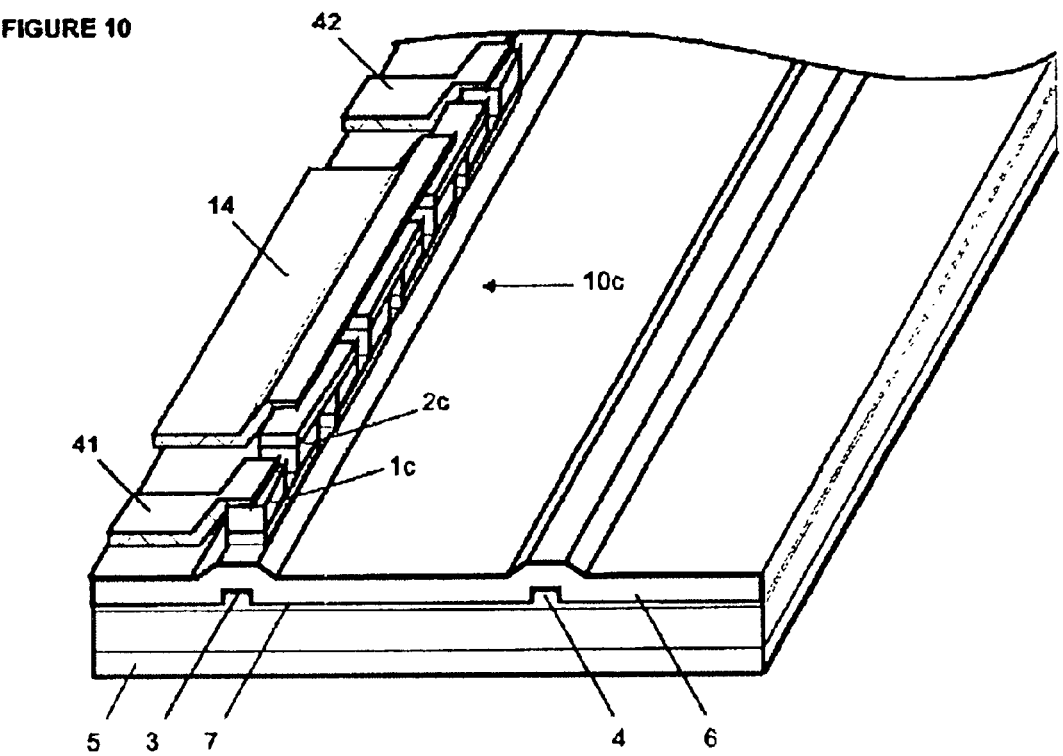
FIG. 10 shows a side elevation of a device with one thermal side of a Peltier element connected to a heat sink element.

FIG. 10 shows a thermoelectric element 10c with the junctions forming the cold side bonded onto the cladding layer aligned above a first waveguide 3. In order to avoid a floating of the temperatures on the thermal sides of the thermoelectric element 10c, the junctions forming the hot side are connected to a heat sink element 14 which is attached to the cladding layer 6. The heat sink element 14, which preferably is made of aluminum, provides an almost constant reference temperature allowing to maintain the phase-shifting device in a controlled operating condition.

Manufacturing opto-electronic integrated devices, as shown in FIG. 9 or 10, involves several steps for building up the required structures. Adding additional material in order to build a thermoelectric element 10 is a time-consuming process which is relevant for the resulting costs of the device.

It would therefore be desirable to use materials to build thermoelectric elements 10 which are already available within the basic structure of the device or which could be applied with simple techniques.

In case that semiconductor materials are available, said materials could geometrically be structured and doped in order to obtain N- and/or P-type segments. Since process of doping semiconductor elements would be easier to handle than a process designed to build structures as shown in FIG. 9 or 10, it would even be advisable to add semiconductor material where required or to modify already provided semiconductor material in order to build a thermoelectric element 10.

Figure 11:
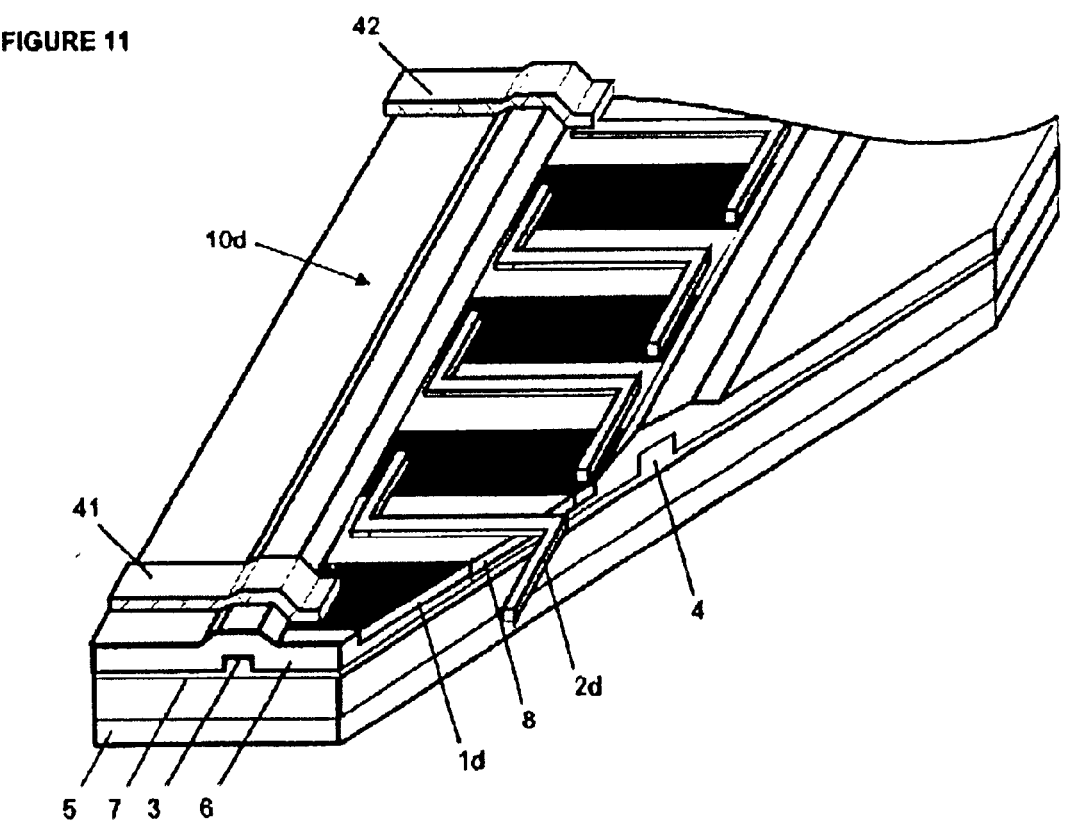
FIG. 11 shows a side elevation of a device with a Peltier element comprising serially connected metal and semiconductor elements which are part of a semiconducting cladding layer.

FIG. 11 shows such an embodiment of the invention with an integrated device comprising a semiconducting cladding layer 6. Segments 1d of a thermoelectric element 10d are being diffused into the cladding layer 6 alternating with differently doped segments 8 enclosed in between. The depth of the doped segments 1d, 8 which are of N- or P-type, is preferably selected in the range from 5 to 10 microns. The differently doped segments 8 are isolating the thermoelectric segments 1d which are serially connected by metal segments 2d preferably made of aluminum in such a way that the even numbered junctions forming one thermal side are placed adjacent to a first waveguide 3 and the odd numbered junctions forming the other thermal side are placed adjacent to a second waveguide 4. Devices as shown in FIG. 11, wherein serially connected semiconductor segments 1d and metal elements 2d form a thermoelectric element 10d, can be created with high precision and high packing density at low cost.

FIG. 12 shows a further embodiment of the invention with an integrated device comprising a cladding layer 6 made of insulating material such as SiO2. In order to build a thermoelectric element 10e, a semiconductor layer 120 has been added to the cladding layer 6. Segments 1d of the thermoelectric element 10e are being diffused into the semiconductor layer 120 alternating with differently doped segments 8 enclosed in between. The differently doped segments 8 are, as described above, isolating the thermoelectric segments 1d which are serially connected by metal segments 2d preferably made of aluminum in such a way that the even numbered junctions forming one thermal side are placed adjacent to the first waveguide 3 and the odd numbered junctions forming the other thermal side are placed adjacent to the second waveguide 4

FIG. 13 shows a further embodiment of the invention with an integrated device, turned upside down, comprising a semiconductor substrate 5 with a thinned region respective a broad furrow 9 designed to receive a thermoelectric element 10f in such a way that the thermal ends are located close to the waveguides 3, 4. For this purpose small furrows could also be arranged above the waveguides 3, 4. Segments 1d of the thermoelectric element 10e are being diffused into the substrate 5 alternating with differently doped segments 8 enclosed in between. The differently doped segments 8 are, as described above, isolating the thermoelectric segments 1d which are serially connected by metal segments 2d preferably made of aluminum in such a way that the even numbered junctions forming one thermal side are placed adjacent to the first waveguide 3 and the odd numbered junctions forming the other thermal side are placed adjacent to the second waveguide 4.

The segments 1, 2 forming thermoelectric elements 10 implemented in devices can therefore be a) differently doped semiconductor elements,
b) a doped semiconductor element and a metal element or an alloy,
c) two metal elements or alloys.

Metal segments 1, 2 are preferably made of aluminum, copper, platinum, iron, chromium, constantan, rhenium, rhodium and/or nickel.

As described above, the phase-shifting devices can be realised in small dimensions. Two waveguides 3, 4 can therefore be arranged in close proximity so that light energy of transferred optical signals can be coupled from the first to the second waveguide 3, 4 and vice versa. Optical devices such as the optical resonators shown in FIG. 12 and FIG. 13 realised with the phase-shifting devices in smaller dimensions can therefore operate in higher frequency regions. In order to maintain the required coupling length, the thermoelectric element 10c, 10e are preferably bent along corresponding sections of curved waveguides 3, 4.

As described above currents are applied to the thermoelectric elements 10 according to selected temperature differences and phase shifts by a control unit 90. In order to reach and hold a selected phase shift in a narrow range the temperature is preferably monitored. As soon as a temperature gradient has been applied across the thermoelectric element 10, the initially uniform charge carrier distribution is disturbed because free charge carriers will diffuse from the high-temperature end to the low-temperature end. This results in the generation of a back emf which opposes any further diffusion current. The open-circuit voltage when no current flows is the Seebeck voltage which is therefore proportional to the temperature difference (see [4], page 8-176). In a preferred embodiment of the invention, the control unit 90, which is connected to the thermoelectric element 10, alternates therefore between an operating-mode and a measurement-mode, during which the open-circuit voltage is measured between the terminals 51, 52 respective 51, 53 of the thermoelectric element 10. In order to avoid temperature drifts during measurement, the time allocated to the measurement-mode is preferably selected short compared to the time allocated to the operating-mode. This measures allow a precisely controlled operation of phase-shifting even under unstable operating conditions of the related opto-electronic integrated circuit.

Since the temperatures of the thermal sides are proportional to the voltage across the thermoelectric element 10, this voltage is preferably sensed by the control unit 90 in order to adjust and maintain a temperature difference which corresponds to a selected phase shift.

Although the present invention has been described in detail with reference to preferred embodiments, persons having ordinary skill in the art will appreciate that various modifications and different implementations may be made without departing from the spirit and scope of the invention.

What is claimed is:

1. An electrically adjustable phase-shifting device arranged on a substrate comprising:
    at least a first waveguide;
    a thermoelectric element arranged adjacent to the first waveguide in order to shift the phase of an optical signal in the first waveguide by means of a thermo-optic effect according to a control voltage applied to the thermoelectric element, wherein the thermoelectric element is a Peltier element comprising:
        a first electrically conducting segment; and
        at least a second electrically conducting segment, said first and at least a second electrically conducting segments being serially coupled, the first and the second segment alternating consecutively, wherein the even numbered junctions of the electrically conducting segments form one thermal side and the odd numbered junctions of the electrically conducting segments form the other thermal side of the thermoelectric element; and
    a control unit adapted for applying electrical currents to the thermoelectric element, respectively, to the first and the second thermoelectric element according to selected phase shifts, wherein said control unit is further adapted to alternate between an operating-mode, wherein current is applied, and a measurement mode, wherein open-circuit voltage is measured between terminals of the thermoelectric element.

2. The device according to claim 1, with the control unit being designed to use intervals for the measurement mode which are shorter than intervals used for the operating-mode.

* * * * *